Patented Nov. 28, 1944

2,364,027

UNITED STATES PATENT OFFICE 2,364,027

STABILIZED VINYL AROMATIC RESINOUS COMPOSITIONS

Alfred L. Marshall, Springfield, Mass., assignor to Monsanto Chemical Company, St. Louis, Mo., a corporation of Delaware No Drawing. Application April 30, 1942, Serial No. 441,131

14 Claims. (Cl. 260—91)

This invention relates to the stabilization of vinyl resins and more particularly to the stabilization of such vinyl resins as polystyrene to discoloration, such as that appearing as a yellowing on exposure to ultraviolet radiation.

It is well known that such vinyl resins as polystyrene, polymers of homologues or analogues of styrene and copolymers of styrene, homologues or analogues thereof with other polymerizable compounds, although beautifully clear when first produced, show a discoloration by becoming yellow on ageing, believed to be due to exposure to ultraviolet radiation, such as in sunlight or from an ultraviolet lamp.

In accordance with this invention, it has now been discovered that certain aromatic hydrocarbon compounds having on the nucleus thereof a hydroxyl group and a carbonyl group in a position adjacent to one another and the derivatives of such aromatic hydrocarbons are especially effective in stabilizing such resins.

In the compounds used as stabilizers in accordance with this invention the hydroxyl group and carbonyl group should be in a position adjacent to one another on the aromatic nucleus. These aromatic compounds may have substituents on the ring, but the compounds having no such substituents are preferred. It is an especially significant feature of this invention that not only are surprising results obtained with regard to stabilization against discoloration on exposure to ultraviolet radiation, but also the resulting composition withstands exposure to elevated temperatures, such as molding temperatures, with no substantial discoloration, such as yellowing.

The stabilizing agents of this invention should preferably be intimately and substantially uniformly incorporated into the resinous material. This may be done in any suitable manner, preferably by addition to the monomer before polymerization or at any stage of polymerization at which the compound can be readily added and mixed into the resin forming mass. It may also be incorporated into the polymerized material even in solid form as by mixing on rolls at a temperature which renders the resinous material plastic, and also, for example, with the aid of a suitable solvent, when required. Usually from about 0.05 to about 2.0% of a stabilizer will be found satisfactory, and a proportion of about 0.2% will usually be found to be an optimum proportion.

The following examples are given primarily to illustrate the invention and to show some of the advantageous results obtained, and not by way of limitation.

0.06 gram of salicylaldehyde (ortho-hydroxy benzaldehyde) were mixed into 30 grams of monomeric styrene and the latter polymerized by heating for about two days at 100° C., and for another two days at 160° C. This produced a solid product containing not more than about 3% unpolymerized material determined as methanol solubles. Discs were molded from the resulting solid polymerized material. For comparison discs were also molded from polystyrene obtained similarly without the addition of salicylaldehyde. Discs molded from the polystyrene which did not contain the salicylaldehyde showed a marked yellowing after an exposure of 24 hours to an ultraviolet lamp, having both a mercury arc and an incandescent filament to give radiation rich in the ultraviolet region (S-1 Sunlamp, General Electric Company), whereas, in striking contrast to the pronounced yellowing obtained on the material without the salicylaldehyde, the discs of polystyrene containing this compound showed no noticeable yellowing. Similarly, the discs of polystyrene containing 2% salicylaldehyde showed substantially less yellowing on exposure for two months to outdoor sunlight than the high degree of yellowing appearing in discs made of polystyrene without the salicylaldehyde. Moreover, the polystyrene containing the salicylaldehyde in addition to being stabilized against discoloration by ultraviolet radiation also withstood temperatures of around 350° F. while being molded, without any substantial discoloration.

The degree of yellowing in samples of polystyrene with and without the stabilizing agent was determined as follows: a light transmission curve for the visible region of the spectrum was obtained for each sample before exposure to ultraviolet radiation and after exposure to ultraviolet radiation. For each sample, since yellowing appears on the transmission curve as a lowering or dropping of the curve at the blue end (region of short visible wave lengths), the difference between the per cent transmission value at 700 millimicrons and the per cent transmission at 420 millimicrons is taken as the measure of the degree of yellowness of any particular sample, and this difference is called the yellowness index. The yellowing due to exposure is obtained by simply subtracting the yellowness index obtained before exposure from that obtained after exposure. This difference in yellowness index is a measure of the yellowing due to exposure. Differences in yellowness index for samples with the stabilizing agent and without the stabilizing agent are compared to show improvement due to the stabilizer, a decrease in such difference indicating an improvement and an increase in the difference indicating that the compound added is detrimental.

For the samples of polystyrene containing no salicylaldehyde the yellowness index was found to be 2.0 unexposed to ultraviolet radiation and 7.0 after exposure for 24 hours to the sun lamp described above, a difference of 5.0. Corresponding material containing 0.2% salicylaldehyde gave a yellowness index of 2.0 before exposure and only 3.5 after a 24-hour exposure to the same sun lamp under the same conditions, a difference of only 1.5, indicating a striking improvement. The difference between the exposed samples with and without this stabilizer is clearly apparent to the eye.

Results obtained with varying proportions of salicylaldehyde tested by exposure for a longer period of 65 hours to the ultraviolet sun lamp (S-1) are given in the following table:

Table

| Sample No. | Per cent salicylaldehyde | Yellowness index | | |
|---|---|---|---|---|
| | | Before exposure | After exposure | Difference |
| 101 | 0.05 | 2.0 | 10.5 | 8.5 |
| 102 | 0.10 | 3.0 | 9.5 | 6.5 |
| 103 | 0.2 | 4.0 | 9.5 | 5.5 |
| 104 | 1.0 | 3.0 | 9.0 | 6.0 |
| 105 | 2.0 | 3.5 | 9.0 | 5.5 |
| 106 | 0.0 | 3.0 | 14.5 | 11.5 |

Usually about 0.2% of salicylaldehyde is an optimum proportion, and from about 0.05 to about 2.0% gives satisfactory results. Larger proportions may be used, but usually proportions greater than about 2% will not be found necessary. Proportions less than about 0.05% may also be used to give some stabilizing effect.

As pointed out above, the hydroxy group and the aldehyde group should be in the ortho position with respect to one another. For example salicylaldehyde (ortho-hydroxy-benzaldehyde) gives surprisingly satisfactory results in accordance with this invention, whereas para-hydroxy-benzaldehyde showed a difference in yellowness index between the exposed and unexposed samples, of 7.0. This is worse than the polystyrene without this compound, which gave a difference in yellowness index of only 5.0. It has also been found that the hydroxy group of the salicylaldehyde is significant, since such compounds as ortho-chlorobenzaldehyde, ortho-ethoxy-benzaldehyde and ortho-methoxy-benzaldehyde gave differences in yellowing index between exposed and unexposed samples of 6.5, 9.0, and 7.5, respectively, which likewise are worse than the 5.0 for the sample without these compounds.

It has also been found that the ring substituted salicylaldehyde derivatives are effective as stablizers, although they are not as effective as the preferred salicylaldehyde. For example, 2,4-dihydroxy-benzaldehyde and 2-hydroxy-5-chloro-benzaldehyde, when tested in the same manner as for the salicylaldehyde described above gave differences in yellowness index between unexposed samples and samples exposed to the sun-lamp for 24 hours of only 2.0 and 2.5 respectively, which show a substantial improvement over the polystyrene containing no stabilizer, since it gave a difference in yellowing index of 5.0.

Although salicylaldehyde gives the best results and 2,4-dihydroxy-benzaldehyde and 2-hydroxy-5-chloro-benzaldehyde gives surprisingly satisfactory results as pointed out above, other substituted derivatives of ortho-hydroxy benzaldehyde may be used. Therefore, this invention comprehends the use of nuclear substituted derivatives such as, for example, halogen substituted derivatives, hydroxy substituted derivatives, and alkyl substituted derivatives in which the alkyl groups have less than four carbon atoms. It is preferred to have only one substituent.

This invention also comprehends the use of aromatic hydrocarbon compounds having less than three fused benzene nuclei and having on the aromatic nucleus of the compound a hydroxyl group and a carbonyl group in positions adjacent to one another, the carbonyl group having attached thereto a member selected from the group consisting of hydrogen and alkyl groups having less than four carbon atoms; and nuclear substituted derivatives of such aromatic compounds substituted with members selected from the group consisting of hydroxyl, halogen, and alkyl groups having less than four carbon atoms; for example, such naphthalene derivatives, including illustratively 2-hydroxy-1-naphthaldehyde, 1-acetyl-2-hydroxy naphthalene, 2-hydroxy-5-chloro-1-naphthaldehyde, 1-acetyl-2-hydroxy-5-methyl-naphthalene, and benzene derivatives, including illustratively ortho hydroxy acetophenone, 4-methyl-2-hydroxy-benzaldehyde, and 5-ethyl-2-hydroxy-benzaldehyde.

The stabilizing agents of this invention may be used alone or with other stabilizing agents.

The stabilizing agents which are especially effective in polystyrene may also be added to polymers of the homologues and analogues of styrene such as the halo-styrenes, for example, the chloro styrenes, such as para-chlorostyrene; divinyl benzene; alpha-methyl styrene; the nitro-styrenes, such as para-nitro styrene; the alkyl ring-substituted styrenes, such as para-ethyl styrene; vinyl naphthalenes and substitution products thereof. They may also be added to copolymers of these compounds with other polymerizable materials, such as vinyl chloride, vinyl ethers, acrylic esters, acrylonitrile, vinyl carbazole, dimethallyl maleate, diallyl adipate, divinyl benzene, dihexyl methallyl oxy succinate, vinyl hexyl phthalate, octyl allyl maleate, 2-ethyl hexyl acrylate esters, octyl acrylate, butyl methacrylate, hexyl methacrylate, and octyl methacrylate. Therefore, this invention embraces the use of the stabilizing agents of this invention in these materials.

I claim:

1. A resinous composition comprising a vinyl aromatic resin which normally becomes discolored upon aging and a stabilizing agent therefor comprising a compound selected from the group consisting of aromatic hydrocarbon compounds having less than 3 fused benzene nuclei and having on the aromatic nucleus of the compound a hydroxyl group and a carbonyl group in positions adjacent to one another, the carbonyl group having attached thereto a member selected from the group consisting of hydrogen and alkyl groups having less than 4 carbon atoms; the nuclear substituted derivatives of such aromatic compounds substituted with members selected from the group consisting of hydroxyl, halogen and alkyl groups having less than 4 carbon atoms.

2. A resinous composition, which normally becomes discolored upon aging, comprising a copolymer of a styrene compound with another polymerizable material and a stabilizing agent therefor comprising a compound selected from the group consisting of aromatic hydrocarbon compounds having less than 3 fused benzene nuclei and having on the aromatic nucleus of the compound a hydroxyl group and a carbonyl group in positions adjacent to one another, the carbonyl group having attached thereto a member selected from the group consisting of hydrogen and alkyl groups having less than 4 carbon atoms; the nuclear substituted derivatives of such aromatic compounds substituted with members selected from the group consisting of hydroxyl, halogen and alkyl groups having less than 4 carbon atoms.

3. A resinous composition comprising a styrene resin which normally becomes discolored upon aging and a minor proportion of a stabilizing agent therefor comprising a compound selected from the group consisting of aromatic hydrocarbon compounds having less than 3 fused benzene nuclei and having on the aromatic nucleus of the compound a hydroxyl group and a carbonyl group in positions adjacent to one another, the carbonyl group having attached thereto a member selected from the group consisting of hydrogen and alkyl groups having less than 4 carbon atoms; the nuclear substituted derivatives of such aromatic compounds substituted with members selected from the group consisting of hydroxyl, halogen and alkyl groups having less than 4 carbon atoms.

4. A resinous composition comprising polymerized styrene containing a minor proportion of a stabilizing agent selected from the group consisting of aromatic hydrocarbon compounds having less than 3 fused benzene nuclei and having on the aromatic nucleus of the compound a hydroxyl group and a carbonyl group in positions adjacent to one another, the carbonyl group having attached thereto a member selected from the group consisting of hydrogen and alkyl groups having less than 4 carbon atoms; the nuclear substituted derivatives of such aromatic compounds substituted with members selected from the group consisting of hydroxyl, halogen and alkyl groups having less than 4 carbon atoms.

5. A resinous composition comprising a vinyl aromatic resin which normally becomes discolored upon aging and a stabilizing agent therefor comprising a salicylaldehyde.

6. A resinous composition comprising a styrene resin which normally becomes discolored upon aging and a stabilizing agent therefor comprising salicylaldehyde.

7. A resinous composition which normally becomes discolored upon aging comprising a copolymer of a styrene compound with another polymerizable material and a stabilizing agent therefor comprising a salicylaldehyde.

8. A resinous composition which normally becomes discolored upon aging comprising a copolymer of a styrene compound with another polymerizable material and a stabilizing agent therefor comprising salicylaldehyde.

9. A resinous composition comprising a styrene resin and a minor proportion of a salicylaldehyde.

10. A resinous composition comprising a styrene resin and a minor proportion of salicylaldehyde.

11. A resinous composition comprising polymerized styrene and a minor proportion of a salicylaldehyde.

12. A resinous composition comprising polymerized styrene and a minor proportion of salicylaldehyde.

13. A resinous composition comprising a styrene resin which normally becomes discolored upon aging and containing as a stabilizer therefor a minor proportion of a hydroxy ring substituted salicylaldehyde.

14. A resinous composition comprising polymerized styrene which normally becomes discolored upon aging and containing as a stabilizer therefor a minor proportion of a halogen ring substituted salicylaldehyde.

ALFRED L. MARSHALL.